United States Patent
Berg et al.

(10) Patent No.: US 10,948,594 B2
(45) Date of Patent: Mar. 16, 2021

(54) SEMI-PASSIVE TRANSPONDER

(71) Applicant: SINTEF TTO AS, Trondheim (NO)

(72) Inventors: Tone Berg, Trondheim (NO); Tonni Franke Johansen, Trondheim (NO); Odd Trandem, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 461 days.

(21) Appl. No.: 16/069,252

(22) PCT Filed: Jan. 11, 2017

(86) PCT No.: PCT/EP2017/050466
§ 371 (c)(1),
(2) Date: Jul. 11, 2018

(87) PCT Pub. No.: WO2017/121752
PCT Pub. Date: Jul. 20, 2017

(65) Prior Publication Data
US 2019/0018135 A1 Jan. 17, 2019

(30) Foreign Application Priority Data
Jan. 14, 2016 (NO) .................................. 20160076

(51) Int. Cl.
*G01S 15/74* (2006.01)
*G01S 1/72* (2006.01)
(Continued)

(52) U.S. Cl.
CPC ................ *G01S 15/74* (2013.01); *G01S 1/72* (2013.01); *G10K 11/205* (2013.01); *G01S 13/75* (2013.01); *G01S 13/751* (2013.01); *H04B 11/00* (2013.01)

(58) Field of Classification Search
CPC . G01S 15/74; G01S 1/72; G01S 13/75; G01S 13/751; G10K 11/205; H04B 11/00
(Continued)

(56) References Cited

U.S. PATENT DOCUMENTS 4,361,911 A 11/1982 Buser et al.
4,486,861 A * 12/1984 Harmel .................. G08C 23/02
367/106
(Continued)

FOREIGN PATENT DOCUMENTS

| EP | 1846917 B1 | 6/2012 |
|----|------------|--------|
| JP | H03-41414 A | 2/1991 |
| JP | 2007-266974 A | 10/2007 |

OTHER PUBLICATIONS

International Search Report issued in PCT/EP2017/050466 dated Apr. 11, 2017 (6 pages).
(Continued)

*Primary Examiner* — Ian J Lobo
(74) *Attorney, Agent, or Firm* — Osha Bergman Watanabe & Burton LLP

(57) ABSTRACT

A semi-passive acoustic transponder providing identity information related to the transponder when it is reflecting a received pulsed acoustic signal underwater. The transponder includes a memory unit holding ID-sequence data controlling operation of the switching device, and an electronic circuit includes frequency adjusting means for adjusting the frequency and duration of the switch such that the duration of the ID-sequence data is shorter than the duration of pulses of the received acoustic signal. Additionally, a method and system may provide position and identity information related to one or more of said semi-passive acoustic transponders.

11 Claims, 5 Drawing Sheets

(51) Int. Cl.
   *G10K 11/20*   (2006.01)
   *H04B 11/00*   (2006.01)
   *G01S 13/75*   (2006.01)

(58) Field of Classification Search
   USPC .......................................................... 367/2, 6
   See application file for complete search history.

(56) References Cited

U.S. PATENT DOCUMENTS 4,516,226 A *   5/1985   Peynaud ................... G01S 5/30
                                                      367/6
   6,046,668 A      4/2000   Forster
   6,060,815 A      5/2000   Nysen
   6,633,226 B1    10/2003   Nysen
   2013/0242704 A1*  9/2013  Strat ................ G06K 19/07749
                                                      367/137
   2015/0138920 A1   5/2015  Hiller

OTHER PUBLICATIONS

Written Opinion of the International Searching Authority issued in PCT/EP2017/050466 dated Apr. 11, 2017 (9 pages).
International Preliminary Report on Patentability from PCT/EP2017/050466 dated Feb. 19, 2018 (12 pages).
Norwegian Search Report issued in NO 20160076 dated Jun. 22, 2016 (2 pages).
Heidrich, J. et al.; "The Roots, Rules, and Rise of RFID"; IEEE Microwave Magazine, IEEEService Center,, vol. 11, No. 3, May 1, 2010, pp. 78-86 (9 pages).
Office Action issued in the counterpart Japanese Patent Application No. 2018-532763, dated Dec. 2, 2020 (8 pages).

* cited by examiner

SEMI-PASSIVE TRANSPONDER

TECHNICAL FIELD

The present invention relates to the technical field of acoustics, and more specifically to an acoustic reflector operating as a semi-passive transponder adapted for providing a unique identification.

BACKGROUND

A transponder is a device that emits or reflects an identifiable signal in response to an interrogating received signal. For underwater acoustic applications, there are two main types of transponders, i.e. active and passive transponders.

An active transponder emits signals to be tracked and monitored. It may be automatic devices, which strengthen and/or modifies signals received and relay them back or to another location. In order to do this, an active transponder includes its own transmitter and power supply. Active transponders may further "ping" its identity at set intervals and a receiver will listen for the signal. If it pings frequently, it may be detected quickly. Frequent pinging will however consume more power.

In order to reach far, most transponders used in underwater acoustic applications are active systems. They may transmit a unique identification as well as data if a sensor is included. Transponders operating underwater are typically used for measuring distance, position tracking, navigation or transmission of data from external sensors. This kind of transponders typically comprises a transducer(s), one or more sensors, and some intelligence such as a processor and a controller unit. The intelligence decodes an incoming signal, and estimates which information to be transmitted. This information is converted to acoustic signals by the transducer. The energy in these signals depend on energy available in batteries which have to be replaced or charged on a regularly basis. Depending on the operation-time of the batteries, such systems will stop working if the battery is not replaced or re-charged. These transponders are therefore not fit for identification of lost items, due to the energy solution.

The benefit of an active transponder is that it typically has a longer range than a passive transponder. The drawback is that it is bulky, expensive and has a relatively short power life. This makes it well suited for some specific purposes, while not so well for others.

A passive transponder allows a system to identify you, without having it's own transmitter and power source. Pure reflection systems for under water applications are thus normally not called transponders, but reflectors.

EP 1 846 917 B1 describes a passive acoustic system with some degree of identification. A sphere of a defined radius reflects the incoming signal at the front and at the back. The sphere is made of two materials having different material parameters. One material makes a thin surface layer, the other the rest of the sphere. As sound waves hit the sphere from any direction, sound is reflected at the front, but also refracted into the sphere. A third part is converted to surface waves, travelling around the sphere. All the waves add at the back of the sphere, getting reflected at the transition sphere/water. The amplitude and time lag relative the first reflection is determined by material parameters, thickness of surface layer, size of sphere and frequency. The two reflections define a sort of identification. The transponder is completely passive and does thus not require a power supply. The solution is however not suited for unique identification of several transponders and applications where the reflection signature of a transponder needs to be varied.

The benefit of passive transponders is that they are cheap, small and they do not need a power source. The shortcoming of a passive transponder is that they have comparatively restricted range.

There is a need for small and relatively inexpensive transponders being able to be uniquely identified, located and monitored over a long time without service. This implies no recharging/refilling of energy. Several such transponders can be linked to a wide variety of objects for providing different signatures of reflected acoustic signals.

This will provide a good solution for several underwater applications. One application may include identification of lost fishing gear, which is known to be a global environmental problem. Another application is for providing accurate positions of a trawl door or a Danish seine; a third application is monitoring underwater systems, like aqua culture nets. In order to prevent escapes it is especially important to be able to continuously monitoring the shape of such nets when exposed to heavy wind and current. An alarm can for instance be triggered if the shape of a net falls outside a given norm.

Existing systems suited for providing unique identification are mostly based on active transponders with transmitters requiring relatively high power for operating and transmitting. This is a known problem and lead to dead transponders if not found after a short time for recharging or changing batteries.

The present invention comprises an acoustic transponder for underwater applications, identifying itself through a unique ID-sequence modulated into the received and reflected signal at the transponder. This is implemented by a dynamic change in reflection coefficient. A small battery feeds the electronics generating the ID-sequence with energy, naming it semi-passive. The transponder is based on reflection of acoustic signals, where the incoming signal, the reflection coefficient and the unique code in combination define the reflected signal. Only very little power is necessary for operation, making a power source last for many years.

The present invention will provide a cheaper solution than active transponders suitable for use in underwater applications. It is further maintenance-free for several years with respect to energy, and well suited for identification and retrieving of lost fishing gear, monitoring of net cages for alarm purposes, and positioning units on fishing gear in use like trawl and Danish Seine.

The invention is further well suited for applications where a tagged object is to be invisible. In order to be identified a receiver has to search for specific signatures in the reflected signal from a transponder. An echo from a transponder may thus easily be mixed up with echoes from other objects in the sea.

BRIEF DESCRIPTION OF THE INVENTION

The present invention is set forth and characterized in the main claims.

In particular, the present invention is defined by a semi-passive acoustic transponder providing information related to the transponder when it is reflecting an acoustic signal, said transponder comprises an electronic circuit connected to a transducer and a power supply. It is characterised in that the electronic circuit is configured for modulating the reflection coefficient of the transducer.

The invention is also defined by a method for providing information related to a semi-passive acoustic transponder when reflecting an acoustic signal; said transponder is provided with an electronic circuit connected to a transducer and a power supply. The method is characterised in modulating the reflection coefficient of the transducer by means of the electronic circuit.

The invention further comprises a system for providing information related to one or more semi-passive acoustic transponders, the system comprises a transmitter and a receiver for transmitting and receiving signals to and from the transponders, each transponder comprises an electronic circuit connected to a transducer and a power supply. The system is characterised in that the electronic circuit is configured for modulating the reflection coefficient of the transducer, and where said receiver comprises means for interpreting signals reflected from each acoustic transponder.

Further features and embodiments of the semi-passive transponder, the method and system comprising such transponders are defined in the claims.

DETAILED DESCRIPTION OF THE INVENTION

The invention can be described as a semi-passive transponder. It is an acoustic reflector with special properties, which has been developed for location and identification of objects. The transponder comprises an assembly of different units, i.e. a transducer, electronic circuits, and a power supply for powering the assembly. It may further comprise a sensor.

The transponder depends on an external unit being able to transmit a signal of duration $T_d$ with a bandwidth B matching the bandwidth of the transducer on the transponder. The transponder system provided is a passive system, where the transmitted signal from the external unit is modulated and reflected when hitting the transducer face. The modulation signal might be a sequence of N bits, with bit length $T_{chip}$. The transponder can thus be identified, and roughly located.

By using dedicated signals transmitted from the external unit, it is possible to estimate the position of objects equipped with a semi-passive transponder according to the invention. It is possible to separate echoes from a transponder from echoes from other reflecting objects. Use of a sequence for modulating the reflection coefficient of the transducer makes it possible to identify a transponder under poor signal to noise conditions.

According to one embodiment of the invention, a sensor (or many) is also included in the semi-passive transponder. Sensor data is modulated into the reflected signal.

Since the transponder is passive in the meaning that is does not include its own transmitter but only reflects the incoming signal; no high-energy battery is required. This gives a cheap transponder with a long operational life. The transducer may consist of several directive transducers to cover a wide number of directions in the sea, one omnidirectional transducer, or several configured for different purposes. This choice will be part of a specific system design.

The invention will now be described in details with reference to the figures.

Figure 1:
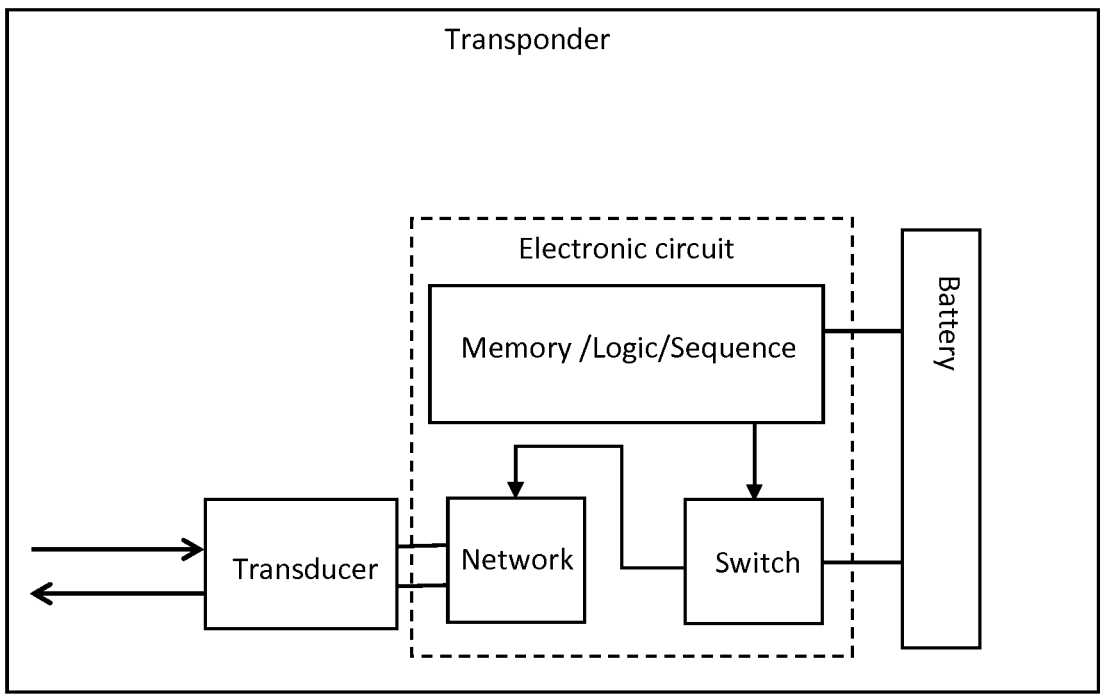
FIG. 1 illustrates a semi-passive transponder according to the invention.

FIG. 1 illustrates an acoustic transponder according to the invention. The acoustic transponder may be characterised as a semi-passive transponder since it does not comprise a transmitter for transmitting signals.

The semi-passive transponder acts like well-known RFID tags, but uses acoustic waves and a piezo ceramic transducer instead of RF waves and RF antennas. The transponder can float or be attached to an object in water, thus controlling to a certain degree the look direction of the different transducers.

In its simplest configuration, the transponder comprises a transducer, an electronic circuit, and a power supply. In one embodiment, the electronic circuit comprises a memory/logic unit, a network connected to the transducer and which is representing a load, and a switch. The electronic circuit is configured for modulating the reflection coefficient of the transducer.

In one embodiment, the electronic circuit comprises an electric network terminated at the transducer. The electric network is configured to switch the electric side of the transducer in and out, thereby changing the termination of the transducer, and hence the reflection coefficient.

The reflection coefficient of the transducer can be altered between two or more values by means of a switch comprised in the electronic circuit. When using two values, which is the simplest case, the values should be close to zero and one.

In one embodiment, the electronic circuit of the semi-passive transponder comprises a memory unit for holding sequence data controlling the switching device. Sequence data defines the operation of the switch, and in turn how the electronic circuit modulates the reflection coefficient of the transducer. The operation of the switch is defined by the switching frequency and duration.

A transducer design will vary with application. In the simplest case, a transducer is composed of a piezoelectric plate and some matching layers. This is used as an example.

Figure 2:
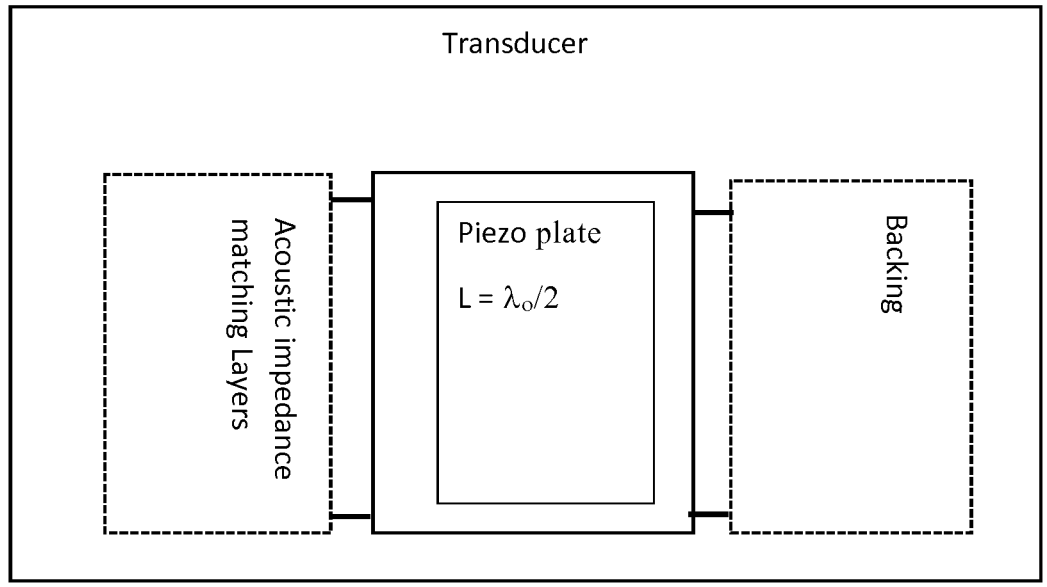
FIG. 2 illustrates a standard transducer design with front and backing layers for matching the acoustic impedance of a transducer to the medium in which it is to be used.

According to one embodiment of the invention, the transducer comprises a piezo plate with front layer(s) and a backing layer. The front layer protects the piezo plates and acts as impedance transformers into the medium in which it is to be used, ref. FIG. 2. The front layer is typically one or more plates of $\lambda/4$ thicknesses, which widens the bandwidth, and reduces the ringing. To minimize the energy loss behind the piezo plate a material with low characteristic impedance is normally used as backing.

At a given frequency, the piezo plate will have thickness resonance, and the conversion from electric to acoustic energy becomes highly efficient. This happens when plate thickness L is half of the wavelength λ; L=λ/2; thus defining resonance. The transducer design is rather free with respect to modes.

Figure 3:
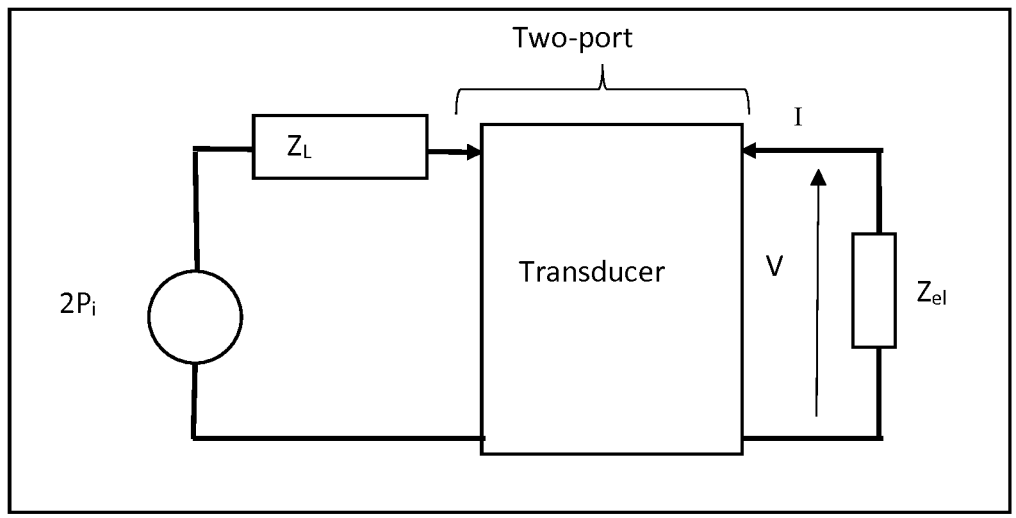
FIG. 3 is a circuit of a transducer represented as a two-port model with an electric and acoustic side.

FIG. 3 shows a transducer represented as an electrical equivalent circuit with a two-port, an electric and acoustic load, and a source.

The acoustic side of the two-port represents the water side of the transducer. The load impedance is water [$Z_L$]. An acoustic pulse of pressure $P_i$ hits the transducer, and transforms to an electric pulse in the piezo ceramic material. U is the velocity on the surface. A network [$Z_{eL}$] terminates the electric side of the two-port. Normally this network is designed to match the output impedance of the transducer with the input impedance of the receiver in order to minimize reflections at this transition. In this embodiment, the network is used to control the reflection coefficient, seen from the front phase of the transducer. The network is a combination of electric resistor(s), inductors and capacitors in different configurations. The impedance representing the termination is strongly frequency dependent. A correct configuration has to be found by simulation of the reflection coefficient (R).

The two-port is described by the following matrix:

$$\begin{pmatrix} I \\ U \end{pmatrix} = \begin{pmatrix} Y_e & H_{tt} \\ H_{tt} & Y_M \end{pmatrix} \begin{pmatrix} V \\ 2P_i \end{pmatrix}$$

where:

$H_{tt}$ is a transfer function from the acoustic to the electric side. This parameter is calculated, or measured indirectly.

$Y_e$ is the admittance on the electric port with zero pressure on the acoustic input port. This parameter is measured directly, or calculated.

$Y_M=1/Z_M$ is the mechanical admittance on the input port. This parameter is calculated, or measured indirectly when the electric port is short-circuited.

$$H_{tt} = \frac{U}{V} \bigg| p_i = 0$$

$$Y_e = \frac{I}{V} \bigg| p_i = 0$$

$$Z_i = \frac{1}{Y_e}$$

$$H_{tt} = \frac{I}{2p_i} \bigg| V = 0$$

$$Y_M = \frac{U}{2p_i} \bigg| V = 0$$

$$Z_M = \frac{I}{Y_M} = Z_{ml} + Z_L \,|\, V = 0$$

Figure 4:
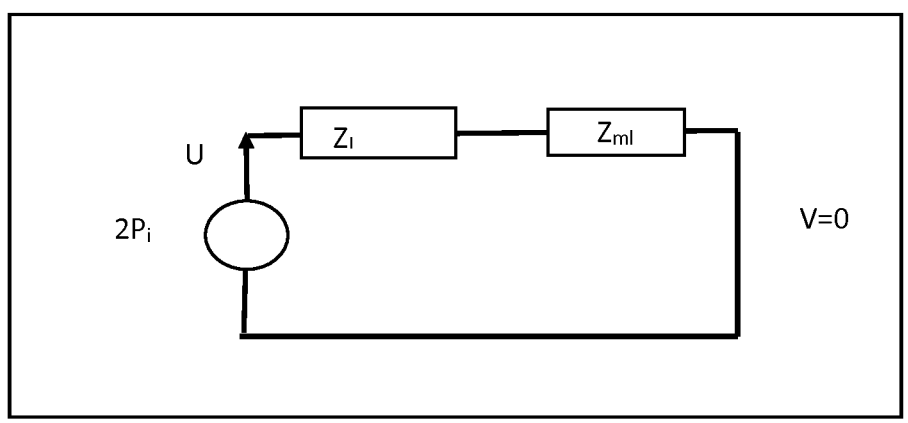
FIG. 4 is a circuit representing the mechanical side of a transducer with the electric port short-circuited.

FIG. 4 shows the two-port model when the electric port is short-circuited.

The reflection coefficient is the main parameter for the working conditions of the transponder. The reflection coefficient is defined as:

$$R = \frac{p_r}{p_i}$$

$$p_i + p_r = p_t$$

$$U_i + U_r = U_t$$

Where $p_i$ is the incoming pressure pulse, $p_r$ is the reflected pulse, and $p_t$ is the transmitted pulse at the transducer face. U is the velocity of the same pulses.

By substitutions and use of boundary conditions for both U and p one finds that the reflection coefficient for a two-port shown in FIG. 2 can in general be expressed by:

$$R = 1 - 2 \cdot Z_L \cdot Y_M + \frac{H_{tt}^2 \cdot 2 \cdot Z_L}{Y_e + \frac{1}{Z_{eL}}}$$

We have three different states on the electric side: Open, short-circuit and loaded.

When we shortcut the terminals the third term in the general expression will be zero and the reflection coefficient is:

$$R_s = \frac{p_r}{p_i} = \frac{Z_M - 2Z_L}{Z_M}$$

If we open on the electric side, the reflection coefficient is:

$$R_o = 1 - 2 \cdot Z_L \cdot Y_M + \frac{H_{tt}^2 \cdot 2 \cdot Z_L}{Y_e} = R_S + \frac{H_{tt}^2 \cdot 2 \cdot Z_L}{Y_e}$$

The general case is then expressed by the special cases $R_s$ and $R_o$:

$$R = \frac{R_o \cdot Z_{eL} + R_s \cdot \frac{1}{Y_e}}{Z_{eL} + \frac{1}{Y_e}}$$

We will get zero reflection R=0 when:

$$Z_{eL} = \frac{-R_S \cdot Z_i}{R_o}$$

For $Z_{eL}$ to be realizable with passive components, the real part of ($R_s \cdot Z_i/R_o$)<0. This has to be solved by using capacitors, resistors and inductors in a network configuration satisfying the condition.

Figure 5A:
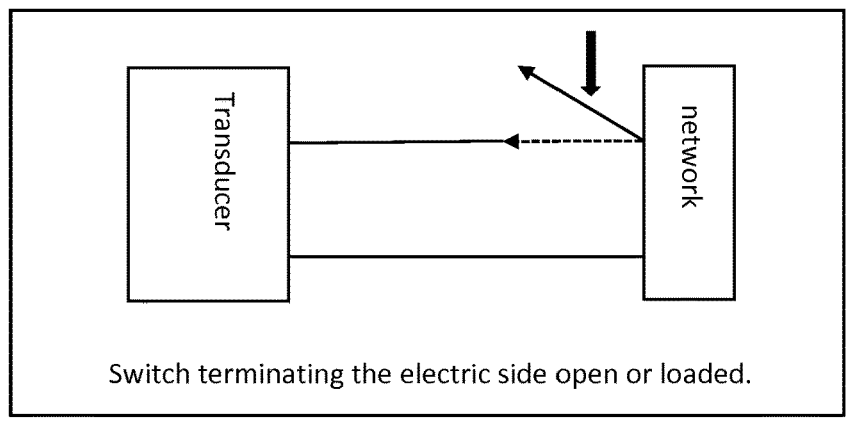
FIGS. 5a and 5b shows two different switching configurations.
Figure 5B:
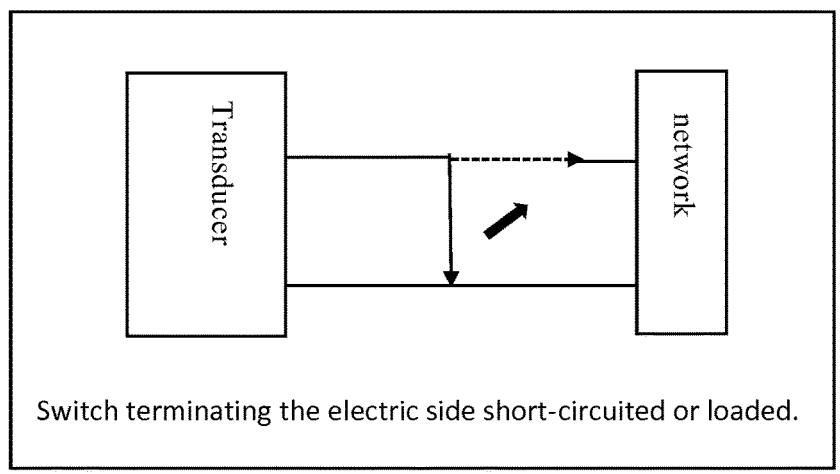

If we design the network in a two-level system carefully, we will be able to vary the reflection coefficient between close-to-zero and close-to-one, while switching the network, i.e. the load, in and out. Either by switching between short-circuit and loaded, or between open and loaded, both illustrated in FIGS. 5a and 5b.

In this description, a two-level system is used as an example for simple explanation of the invention. In a multi-level system, the reflection coefficient may be varied between more that two different levels.

Figure 6:
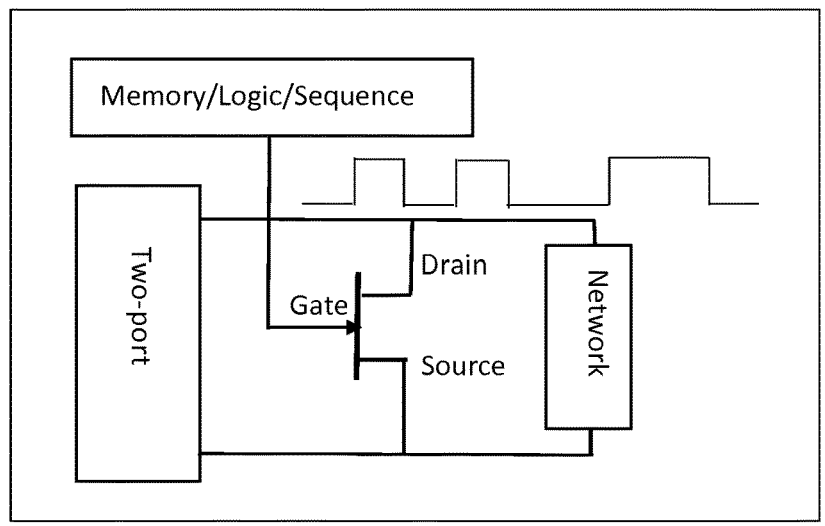
FIG. 6 shows an example of a switch implementation through a FET transistor.

FIG. 6 shows an example of implementation of a switch in a two-level system using a FET transistor. This type of transistor will open or close according to voltage on Gate. The voltage is the sequence of 1's and 0's, stored in memory, but linked to the input Gate. This sequence is finite, but looping continuously.

Figure 7:
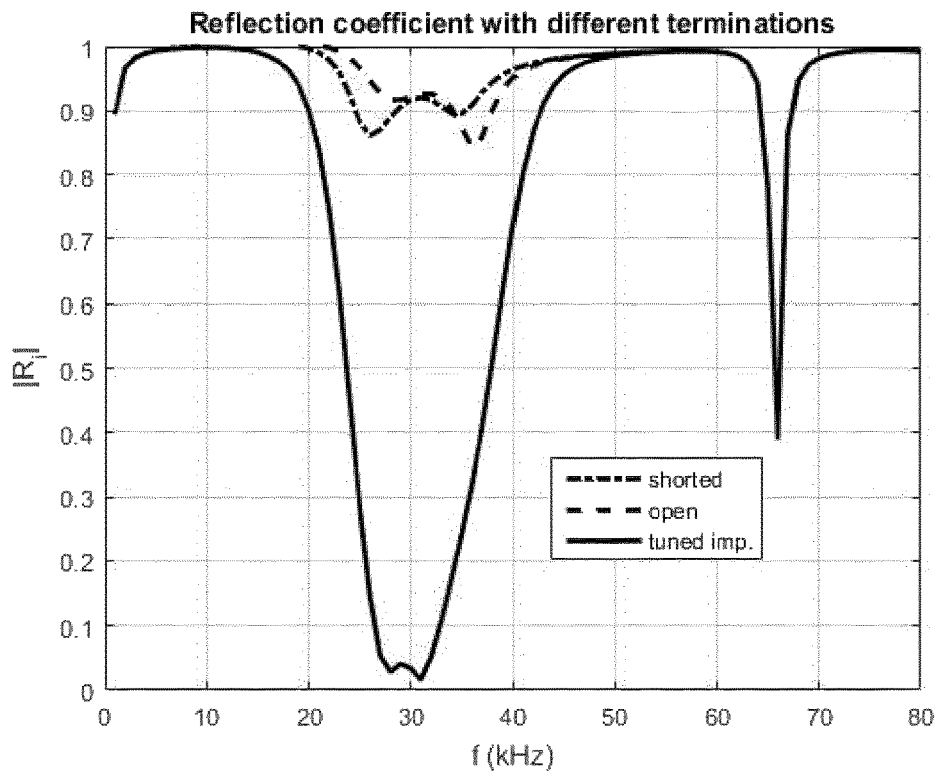
FIG. 7 is a plot diagram of reflection coefficient as a function of frequency, based on a simulation of the reflection coefficient with the electric side of the transducer short-circuited, open, and loaded.

FIG. 7 shows a simulation of the reflection coefficient as a function of frequency, with the electric side of the transducer in three states: 1) Loaded with a network, 2) short-circuited and 3) with open output.

In the two-level system according to the described example, the simulated system is designed for two-level signalling; one or zero. The optimum design is to get a reflection coefficient close to zero and one (max difference). The example is based on a piezo ceramic transducer with resonance at 30 kHz in thickness mode, composed of a 68 mm piezo ceramic layer, and a 25 mm matching layer of epoxy. The reflection coefficient for the transducer with a load/network is shown with continuous lines, while the dotted lines represent a short-circuit load, and an open load. The network is a resistor and an inductor in series. At 30 kHz, the difference between load and open/short-circuited is large. One has to be careful in the design by making the bandwidth wide enough for transmission of sidebands.

The change in reflection coefficient is used to control the reflection of the input signal at the transducer face, by switching the network, i.e. the load, in and out with a frequency $f_{chip}$. This will modulate the incoming signal of length $T_d$ and frequency $f_0$, while at the same time produce a reflected signal with a signature, given by the switching sequence of $N*T_{chip}$.

Figure 8:
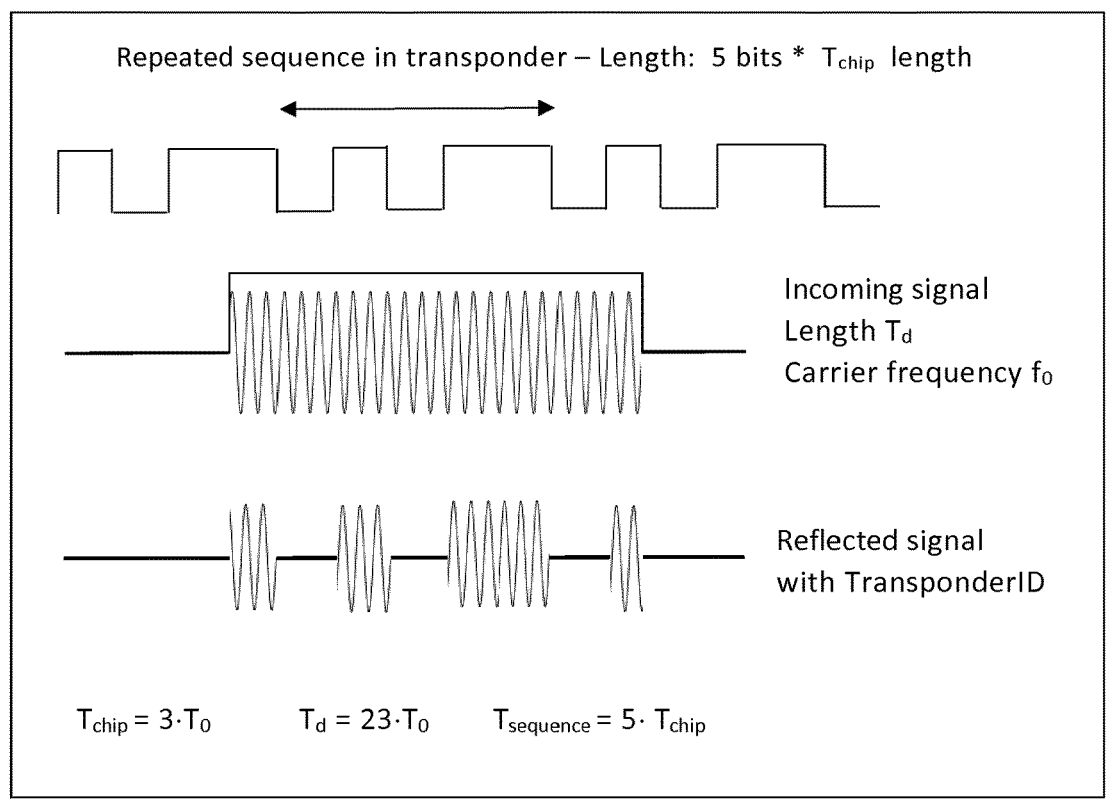
FIG. 8 shows an example of a transponder with a given sequence. The figure shows the incoming signal, the sequence and the modulated, reflected signal.

FIG. 8 shows an example where the transmitted pulse from the external unit is a 23 period long sine wave of duration $T_d$. Carrier frequency is $f_0$ ($T_d=23 \cdot T_0$). The repeated sequence in transponder is 5 bits; 0 1 0 1 1. Each bit of length $T_{chip}$, where $T_{chip}$ is three times $T_0$ ($T_{chip}=3 \cdot T_0$). The modulated, reflected signal will have an envelope of 0 1 0 1 1; with some of the energy "moved" into sidebands. The amount of energy in the sideband will depend on the ratio of the $R_{max}$ reflection coefficient to $R_{min}$.

Figure 9A:
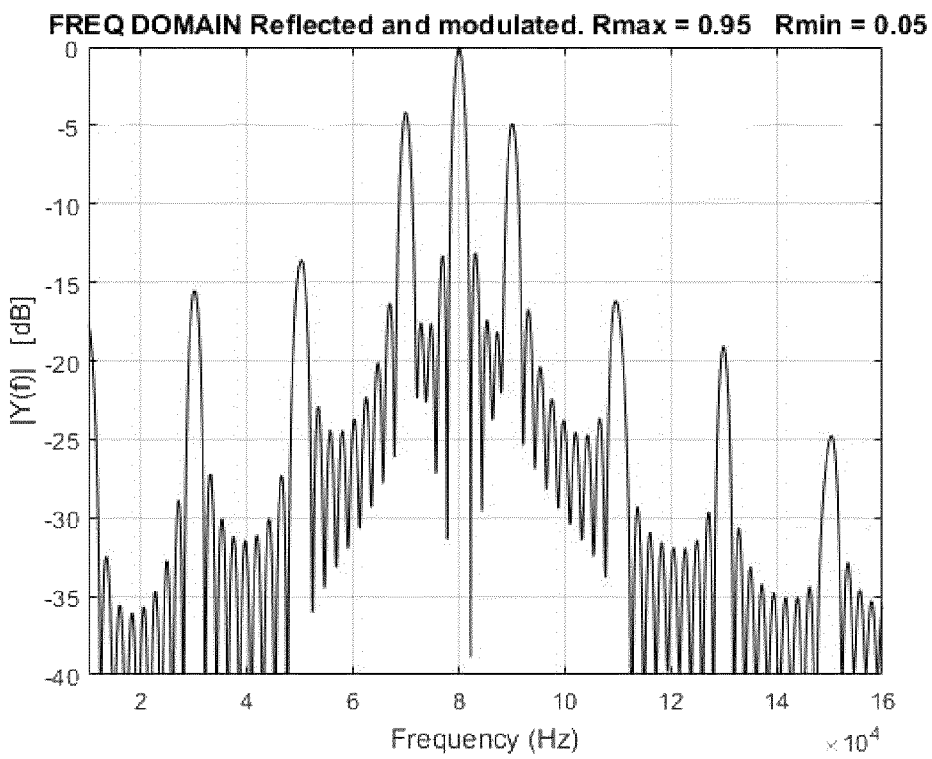
FIGS. 9a and 9b show the amount of energy in the side bands of a carrier when modulating different reflection coefficient intervals.
Figure 9B:
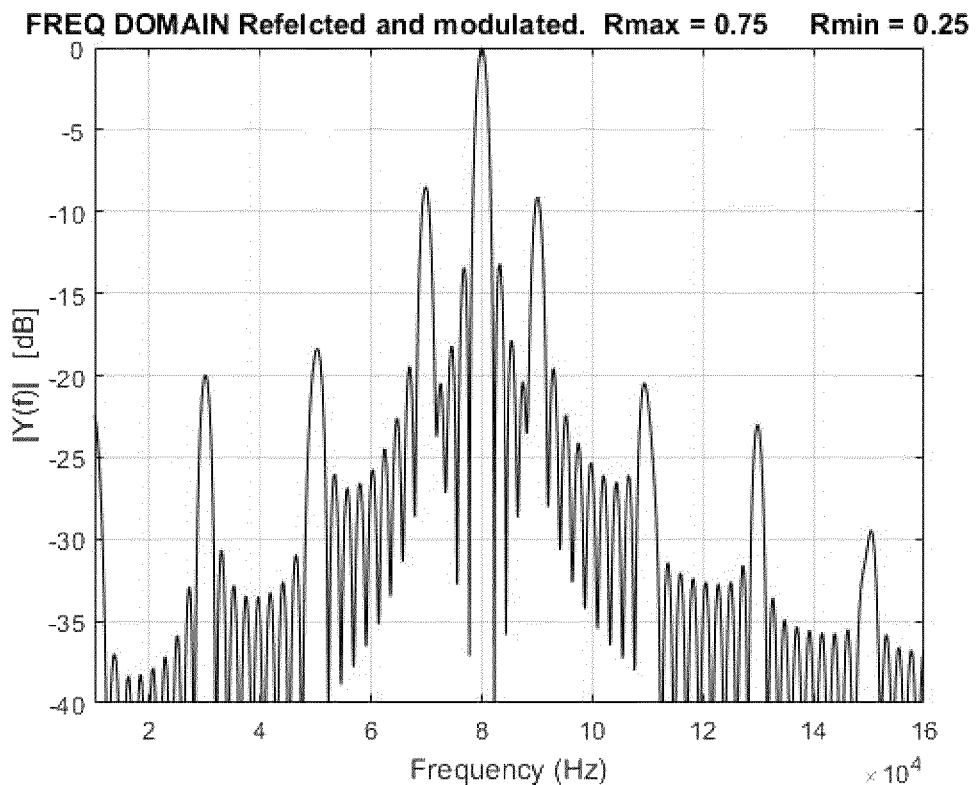

FIGS. 9a and 9b show the amount of energy in the side bands of a carrier when modulating different reflection coefficient intervals. FIG. 9a shows the FFT of the reflected signal when the reflection coefficient R varies between 0.05 and 0.95, while in FIG. 9b R varies between 0.25 and 0.75. As we see, the amplitude is 4 dB below the carrier in FIG. 9a, while it is 8 dB in FIG. 9b.

Different modulation sequences or transmitter signals can be used to achieve wanted spectral shape and correlation properties of the reflected signal from the transponder. These properties can be prioritized to give the wanted compromise between bandwidth, SNR, detection range, distance measurement precision and receiver processing demands.

As an example, a long sine signal from transmitter will make detection possible in low SNR ratios, and thereby make a long detection range possible. On the other hand, the range resolution will be poor. By using a sequence instead of a pure sine in transmitter, the long range will be maintained, but the resolution will increase due to a wider bandwidth. But, the processing demands higher, and a transmitter/receiver system must be more advanced.

In order to receive a transmitted signal, the transducer used in the semi-passive transponder should be able to receive signals from any wanted direction.

According to one embodiment of the invention the transducer is omnidirectional. According to another embodiment, the transducer comprises an assembly of several transducers with a given directivity, assembled in such a way that they cover wanted directions. Some floating system may also be used in order to keep the transducer in the correct half plane. Many directive transducers will increase the weight, but also range. For instance; an assembly of four transducers, each covering an angle of 90 degrees gives a directivity index around 14 dB, which increases the detection range up to a factor of 2 (depending on frequency), compared to an omnidirectional source.

The invention further comprises a method for providing information related to an acoustic transponder when it is reflecting an acoustic signal. The transponder is provided with an electronic circuit connected to a power supply and a transducer connected to the electronic circuit. The method is characterized by modulating the reflection coefficient of the transducer by means of the electronic circuit.

The electronic circuit comprises an electric network terminated to the electric side of the transducer. The termination of the electric network is switched in and out, thereby changing the termination of the transducer, and hence the reflection coefficient.

A switching device may be used for modulation by changing the reflection factor at the transducer face between two or more values. The switching device can be controlled by feeding a sequence of data to the switching device, which in turn varies termination of the network, i.e. the load, at the transducer. In order to provide a unique identification of a transponder where the reflection coefficient is modulated, the sequence of data must have a duration that is shorter than the duration of the transmitted pulse from the external unit.

In one example, an external unit transmits signals with specific pulse duration. These signals may be called request or ping signals. The external unit will then listen for echoes of the signals. Echoes from semi-passive transponders with different modulation of the reflection coefficients will have different signatures. Received signals can be interpreted for determining identification and location of different transponders.

Several semi-passive transponders may be used in a system for providing information related to each transponder. The system comprises a transmitter and a receiver for transmitting and receiving signals to and from all transponders. Each transponder comprises an electronic circuit connected to a power supply and a transducer connected to the electronic circuit, and where the electronic circuit is configured for modulating the reflection coefficient of the transducer, and where said receiver comprises means for interpreting signals reflected from the acoustic transponder.

A system comprising several acoustic transponders may be used in surveillance of relative positioning of the transponders. Each transponder may be connected to equipment that is to be kept under surveillance. For differentiating between the different transponders, each acoustic transponder comprises a memory unit holding different sequence data controlling a switching device thereby providing a unique modulated reflection coefficient and identification. A receiver will be able to interpret the different received signals.

The present invention will provide a cheaper solution than active transponders suitable for use in underwater applications. It is further maintenance-free for several years, and thus well suited for identification and location of equipment at sea, including equipment used in the fishing industry and offshore industry.

The invention claimed is:

1. A semi-passive acoustic transponder providing identity information related to the semi-passive acoustic transponder when the semi-passive acoustic transponder is reflecting a received pulsed acoustic signal underwater, said semi-passive acoustic transponder comprising:
   an electronic circuit connected to a transducer and a power supply,
      wherein the electronic circuit comprises:
         an electric network terminated at the transducer, and
         a switching device configured for changing a termination of the transducer for modulating a reflection coefficient of the transducer;
   a memory unit holding ID-sequence data controlling operation of the switching device; and
   wherein the electronic circuit comprises means for adjusting a frequency and a duration of a switch, such that a duration of the ID-sequence data is shorter than a duration of pulses of the received pulsed acoustic signal.

2. The semi-passive acoustic transponder according to claim 1, wherein the transducer is omnidirectional.

3. The semi-passive acoustic transponder according to claim 1, wherein the transducer comprises an assembly of one or several directive transducers.

4. The semi-passive acoustic transponder according to claim 1, further comprising at least one sensor.

5. A method for providing position and identity information related to one or more semi-passive acoustic transponders when it is reflecting received pulsed acoustic signals underwater, wherein the one or more semi-passive acoustic transponders comprises an electronic circuit connected to a transducer and a power supply, and wherein the electronic circuit comprises an electric network terminated at the transducer and a switching device configured for changing a termination of the transducer for modulating a reflection coefficient of the transducer, the method comprising:
   transmitting the pulsed acoustic signal from a transmitter to the one or more semi-passive acoustic transponders;
   controlling operation of the switching device by feeding ID-sequence data to the electronic circuit and adjusting a frequency and duration of a switch such that a duration of the ID-sequence data is shorter than a duration of pulses of the pulsed acoustic signal; and
   receiving the reflected pulsed acoustic signals from the one or more semi-passive acoustic transponders, and determining position and identity of the one or more semi-passive acoustic transponders based on reflected uniquely identifiable acoustic signals.

6. The method according to claim 5, further comprising providing the one or more semi-passive acoustic transponders with an omnidirectional transducer.

7. The method according to claim 5, further comprising providing the acoustic one or more semi-passive acoustic transponders with an assembly of one or several directive transducers.

8. A system for providing position and identity information related to one or more semi-passive acoustic transponders when reflecting received pulsed acoustic signals underwater, the system comprising:
   an external unit with a transmitter and a receiver for transmitting and receiving signals to and from the one or more semi-passive acoustic transponders,
   wherein the one or more semi-passive acoustic transponders comprises an electronic circuit connected to a transducer and a power supply,
   wherein the electronic circuit comprises an electric network terminated at the transducer and a switching device configured for changing a termination of the transducer for modulating a reflection coefficient of the transducer,
   the transmitter comprises means for transmitting acoustic pulsed signals to the transponders,
   the transponder comprises a memory unit holding ID-sequence data controlling the switching device, and wherein the electronic circuit comprises means for adjusting a frequency and a duration of a switch such that a duration of the ID-sequence data is shorter than a duration of pulses of the received pulsed acoustic signals, and
   the receiver comprises means for interpreting signals reflected from the one or more semi-passive acoustic transponders thereby providing position and identity information of the one or more semi-passive acoustic transponders.

9. The system according to claim 8, wherein the transducer is omnidirectional.

10. The system according to claim 8, wherein the transducer comprises an assembly of one or several directive transducers.

11. The system according to claim 8, further comprising at least one sensor.

* * * * *